Feb. 25, 1958 J. HOCHREUTER 2,824,435
ELASTIC SHAFT COUPLINGS
Filed July 29, 1955 5 Sheets-Sheet 1

Inventor:
JOHANN HOCHREUTER
By Linton and Linton
ATTORNEYS

Feb. 25, 1958  J. HOCHREUTER  2,824,435
ELASTIC SHAFT COUPLINGS
Filed July 29, 1955  5 Sheets-Sheet 3

Inventor:
JOHANN HOCHREUTER
By Linton and Linton
ATTORNEYS

Feb. 25, 1958  J. HOCHREUTER  2,824,435
ELASTIC SHAFT COUPLINGS
Filed July 29, 1955  5 Sheets-Sheet 5

INVENTOR
JOHANN HOCHREUTER
By Linton and Linton
ATTORNEYS

United States Patent Office 2,824,435
Patented Feb. 25, 1958

2,824,435

ELASTIC SHAFT COUPLINGS

Johann Hochreuter, Ansbach, Mittelfranken, Germany

Application July 29, 1955, Serial No. 525,307

12 Claims. (Cl. 64—30)

The present invention relates to elastic shaft couplings and is more particularly directed to a coupling for drive and driven shafts allowing limited resilient rotation therebetween.

The principal object of the present invention is to provide a coupling for a pair of shafts which coupling is resilient permitting a limited turning of said shafts relative to one another and at the same time permits rotational slippage in connection between said shafts when the load upon one or both exceeds a given torque.

A further and equally important object of the present invention is to provide an elastic coupling for the ends of two shafts which coupling includes clutching means permitting a slippage between said shafts above given loads thereon and which clutching means is adjustable and includes a visual indicator by which the tension exerted by said clutch can be readily determined.

A still further and important object of the invention is to provide a shaft coupling which permits limited rotational deviations between the shafts connected thereto and also angular deviations between said shafts.

Further objects of the invention will be in part pointed out and in part obvious from the following detailed description of the accompanying drawings, wherein.

Figure 1:
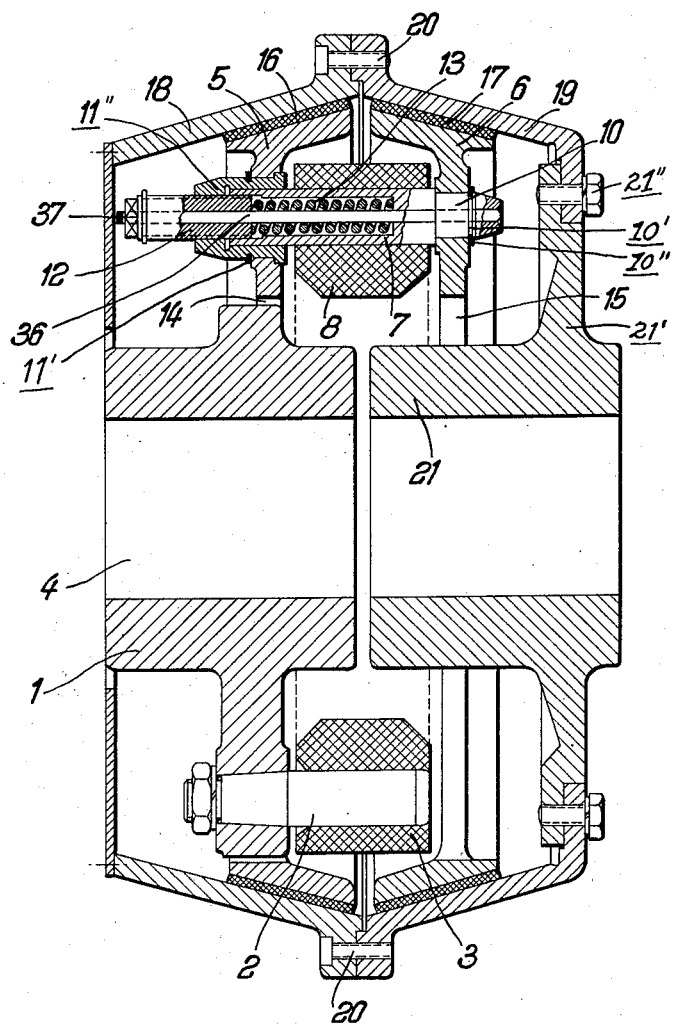
Fig. 1 is a sectional view of the present coupling taken on line *a—b* of Fig. 2.

Referring now more in detail to the accompanying drawings, wherein like and corresponding parts are designated by similar reference characters, numeral 1 refers to a tubular coupling member having a series of drive bolts 2 extending therefrom with each bolt having a wedge shaped guide element 3 rotatably mounted thereon. Said coupling member further has a bore 4 extending substantially parallel to said bolts 2, which is for receiving one of a pair of shafts therein.

A pair of clutch members 5 and 6 of an annular configuration are positioned side by side while cylindrical connectors 7 extend through and are connected to clutch member 6. A wedge shaped guide element 8 is rotatably mounted upon each of said connectors.

Figure 2:
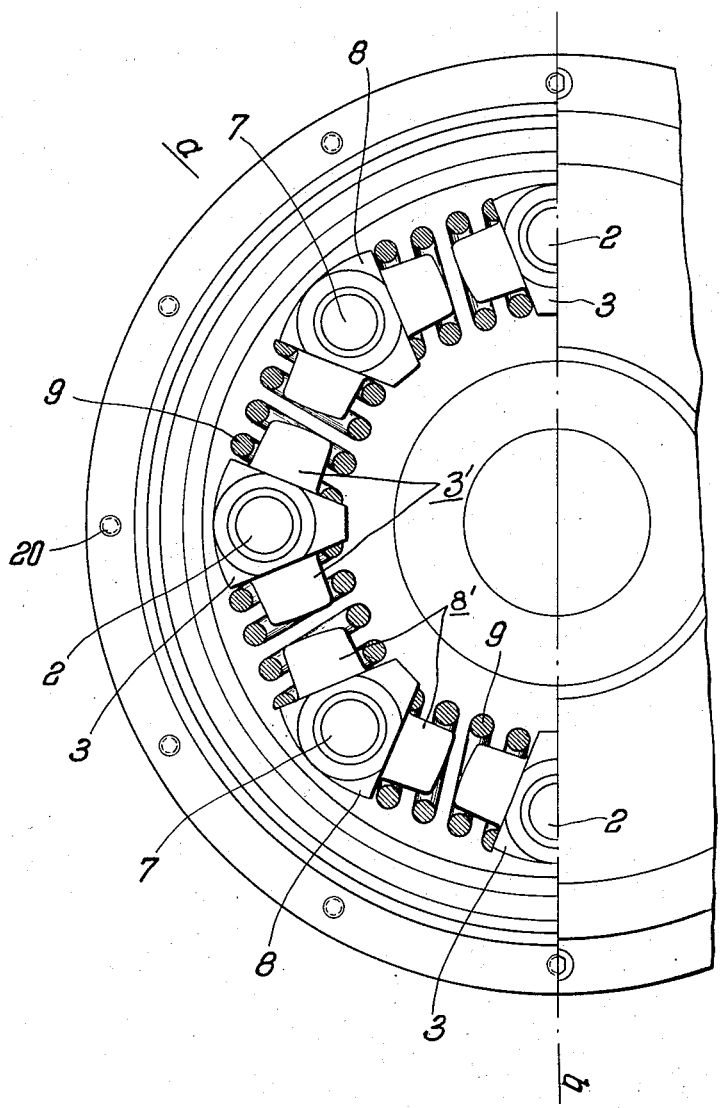
Fig. 2 is a partial cross sectional view disclosing the interior of the coupling in the left half portion of the figure and an elevation thereof on the right side portion.

Connectors 7 extend substantially parallel to bolts 2 with a connector 7 positioned between each pair of said bolts. Guide elements 3 each have a pair of arms 3' each extending from a side of the guide elements radially of bolt 2. Guide elements 8 each have similar arms 8' each extending from a side thereof radially of connector 7 whereby, as best shown in Fig. 2, an arm 3' extends towards an arm 8' for each pair of said guide elements. A plurality of coil springs 9 are each mounted between a guide element 3 and a guide element 8 surrounding an arm 3' and its opposing arm 8'. Connectors 7 are retained on clutch member 6 by a pin 10 of reduced diameter extending through a corresponding opening in said clutch member and having an annular recess 10' in which is mounted a split ring 10" providing a shoulder therefor against clutch member 6.

The tubular bushing 11 extends through a corresponding opening in clutch member 5 and is retained therethrough by a split ring 11' seated within an annular recess 11" of said bushing. An end of connector 7 is slidably mounted in the bore of said bushing. A threaded piston 12 is in threaded engagement with the threaded bore portion of bushing 11 and extends therethrough into the bore of connector 7. A coil spring 13 is positioned within said connector bore and bears against the end of piston 12. The tension on said spring can thereby be varied by rotating piston 12.

Clutch member 5 further has a star shaped central opening 14 through which extends coupling member 1 whose exterior configuration is similarly of a star shape, but sufficiently smaller to permit a spacing between said coupling member 1 and clutch member 5 in order that the coupling member 1 can be turned a given angle in a peripheral direction relative to said coupling members 5 and 6. In all instances this clearance is larger than the necessary angle of movement for the drive bolts 2 and connector 7 in relation to one another. Clutch member 6 also has a cut out portion 15.

Clutch plates 5 and 6 have conical peripheries and are provided with friction linings 16 and 17 respectively. The coupling housing which also forms a clutch plate is formed by annular plates 18 and 19 joined together by bolts 20 and having a conical cross sectional configuration. Said plates 18 and 19 are further joined to a hub 21 which extend into opening 15 of clutch member 6 and which has an annular flange 21' extending laterally thereof with said clutch plate 19 fastened thereto by bolt 21".

Figure 3:
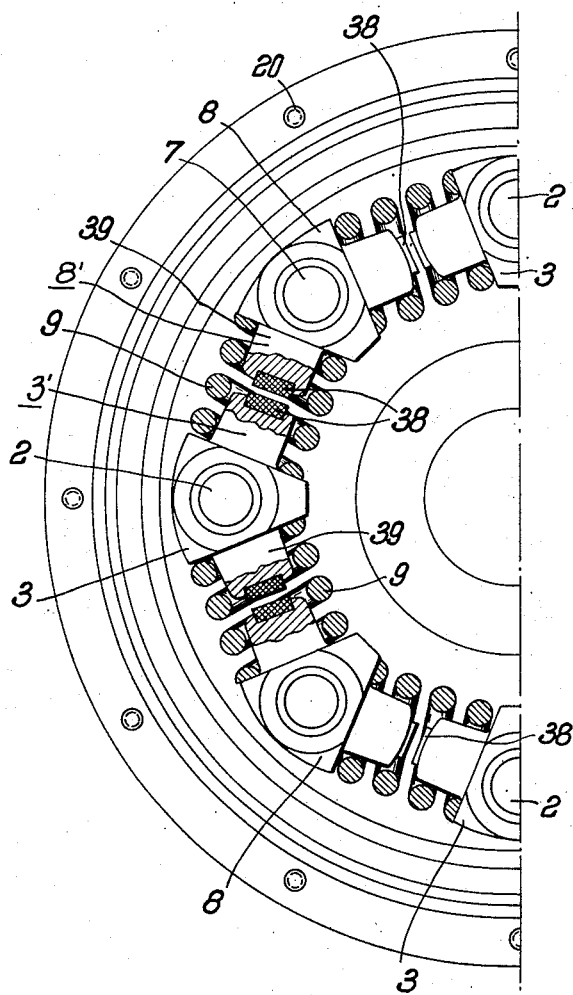
Fig. 3 is a partial cross sectional view of a modified form of coupling.

In Fig. 3 there is shown a modified form of the present coupling which is similar to that shown and described for Figs. 1 and 2, excepting that the arms 3' and 8' of the guide elements 3 and 8 respectively each have a resilient element 38 seated in the end thereof with the resilient elements of opposing arms positioned opposite to one another and extending from said arms for contacting when the coil springs 9 are compressed a given distance.

Figure 4:
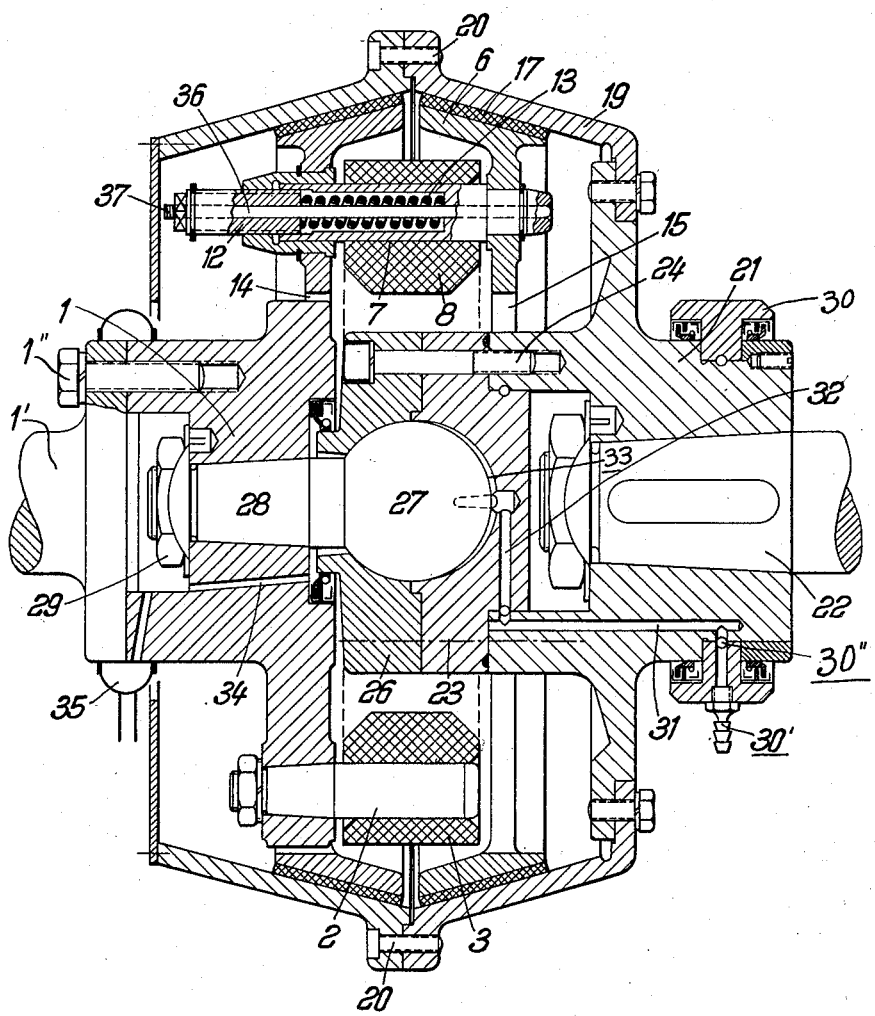
Fig. 4 is a longitudinal section of a still further modification of the present coupling.
Figure 5:
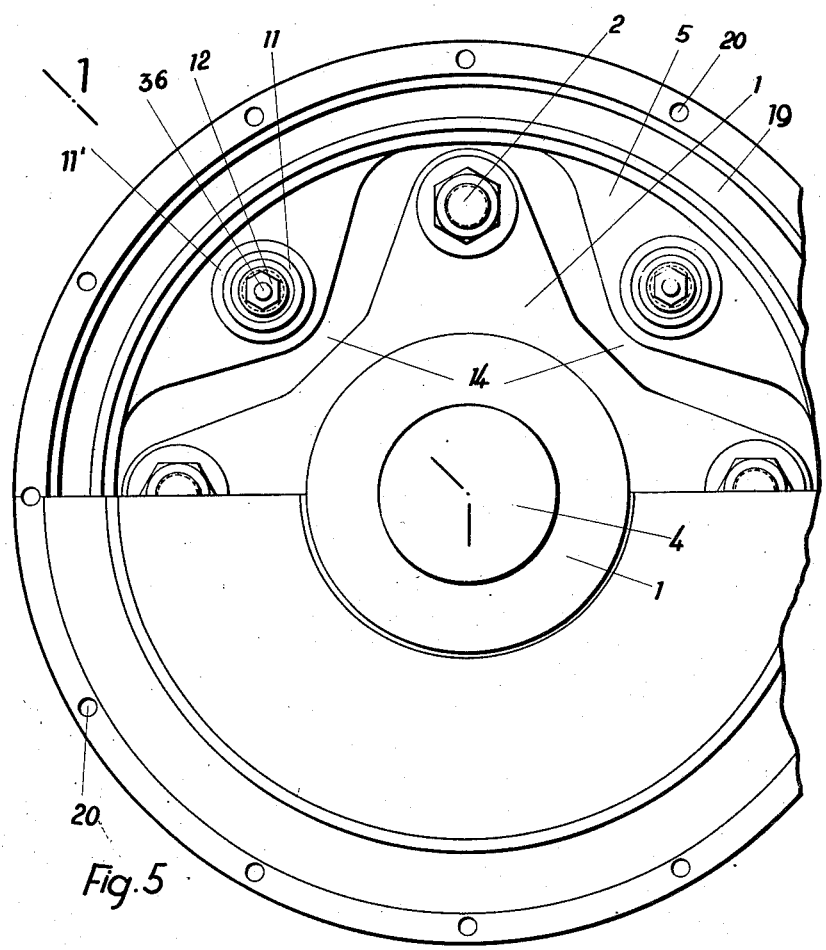
Fig. 5 is an end elevation taken from the left of Fig. 1 with the upper half of the cover plate removed.
Figure 6:
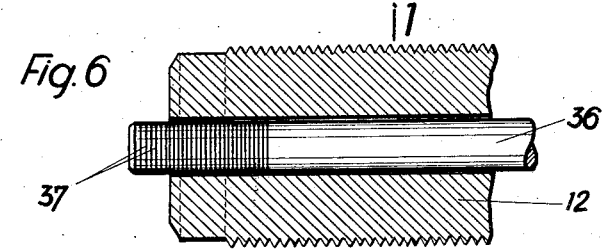
Fig. 6 is an enlarged detailed view of a threaded piston in cross section and a measuring pin therein forming parts of the present device.

In Fig. 4 there is shown a further form of the present coupling which is similar to the couplings shown in Figs. 1 to 3 for the elements referred to by numerals 1 to 21 inclusive. In addition, a driven shaft 22 is fastened within the bore of coupling member 21. Further coupling member 21 has the base half 23 of a socket connected thereto by bolts 24. The top half 26 of the socket is also retained on the base half by said bolts 24 extending therethrough. A ball 27 is mounted within said socket 23—26 and has a leg 28 extending through coupling member 1 and retained thereto by a nut 29 in threaded engagement with the threaded end of said leg. A drive shaft 1' is connected to coupling member 1 by bolts 1".

A ring 30 is mounted upon the periphery of coupling member 21 and has a nozzle 30' in communication with an annular passageway 30" provided between said ring and said coupling member. Passageway 30" is in communication with passageways 31 formed in said coupling member which in turn is in communication with passageway 32 formed in the socket base member 23 and opening into the recess 33 provided in said socket for ball 27. Coupling member 1 has a passageway 34 for receiving lubrication extruded from recess 33 passing the same down to a collector 35.

Connector 7 has an axial opening through which extends a measuring pin 36 which pin likewise extends through an axial bore in piston 12. These measuring pins are secured to connector 7 and axially displaceable in relation to piston 12 and likewise clutch member 5. Further, these pins have measuring indicia 37 on their free end for indicating the tension force of the springs 13 which can be determined by the relative position of the clutch plates 5 and 6.

In the operation of the coupling as shown in Figs. 1 and 2 a shaft such as a drive shaft can be fixedly inserted within bore 4 of coupling member 1 while the end of a further shaft such as a driven shaft can be fixedly mounted within the bore of coupling member 21. Upon rotation of one of the shafts, as for example the shaft connected to coupling member 1, said coupling member will be rotated carrying bolts 2 and guide elements 3 therewith. As coupling member 21 is not yet rotating, it will offer an initial resistance due to the frictional engagement of plates 18 and 19 with the friction surfaces 16 and 17 of the clutch plates 5 and 6 which clutch plates will initially tend to restrain connectors 7 and guide elements 8. These guide elements 3 will push springs 9 against the guide elements 8 pressing said springs until said guide elements 8 begin to rotate therewith and thus the springs take up the initial shock of the rotation and further permit a limited resilient deviation in the rotation of coupling members 1 and 21 due to varying loads and changes of speed.

Connectors 7 are forced towards the right hand side of Fig. 1 pushing clutch plate 6 therewith while bushing 11 is pushed to the left hand side of Fig. 1 carrying clutch plate 5 therewith due to the tendency of spring 13 to expand. Thus friction elements 16 and 17 are forced against housing clutch plates 18 and 19 frictionally engaging the same and causing the same to rotate therewith. However, should the load upon coupling member 21 exceed a predetermined torque, slippage between clutch plates 18 and 19 and members 5 and 6 will be created tending to move said clutch members 5 and 6 together, compressing spring 13. The tension on spring 13 and thus the point at which slippage will occur can be predetermined by screwing piston 12 into or out of bushing 11 as indicated by the markings 37.

The coupling of Fig. 3 operates in a similar manner to the coupling just described, but should guide elements 3 and 8 compress springs 9 until resilient members 38 engage, then said members 38 will increase the resistance offered by springs 9 adding to the power thereof and tending to prevent further compression of said springs.

In the coupling shown in Fig. 4 the operation thereof is substantially the same as for the couplings of Figs. 1 to 3 inclusive, but in addition ball 27 mounted within socket recess 33 can transmit large forces in an axial direction and further permits a limited angular deviation between the coupling members 1 and 21. A lubrication under pressure can be applied to the nozzle 30' and into passageways 30", 31, 32 and into recess 33 for lubricating said ball.

The present device is capable of considerable modification and such changes thereto as come within the scope of the appended claims are deemed to be a part of the present invention.

What I claim is:

1. An elastic shaft coupling comprising a driven member, a drive member carried by a drive shaft and resiliently connected to said driven member forming coupling members therewith, drive bolts connected to each of said two coupling members, springs positioned between said drive bolts for permitting limited rotation of said two coupling members relative to one another, said driven member having a pair of clutch members, said bolts connected to said driven member being formed as resilient connectors, said clutch members being resiliently joined by said resilient connectors tending to move said clutch members apart and a housing carried by the driven shaft and surrounding the clutch members of said driven member for frictional engagement therewith upon said clutch members moving apart.

2. An elastic shaft coupling as claimed in claim 1, wherein said resilient connectors each consist of telescoping hollow members each connected to one of said clutch members and bearing against the other of said clutch members and resilient means positioned in said hollow members tending to move the same and said clutch members apart.

3. An elastic shaft coupling as claimed in claim 1, wherein said resilient connectors each are adjustable to vary the resilient tension thereof as desired.

4. An elastic shaft coupling as claimed in claim 1, wherein said resilient connectors each consist of a cylinder connected to one of said clutch members, a bushing connected to the other of said clutch members and having said cylinder slidably extending therein, a coil spring mounted in said cylinder and a piston adjustably mounted in said bushing and bearing against said spring for varying the tension thereof.

5. An elastic shaft coupling as claimed in claim 1, wherein additional resilient members are positioned between said drive bolts of the drive member and said resilient connectors of said driven member reinforcing said springs above a given loading on said coupling.

6. An elastic shaft coupling as claimed in claim 1, wherein guide elements are pivotally mounted on each of said bolts and on each of said resilient connectors, said guide elements having pins extending therefrom towards the pins of adjacent guide elements and resilient means such as springs are carried by said pins.

7. An elastic shaft coupling as claimed in claim 1, wherein said resilient connectors between the clutch members of said driven member each consist of telescoping hollow members each connected to one of said clutch members, resilient means positioned in said hollow members tending to move the same apart, and measuring pins connected to one of said clutch members and axially displaceable relative to the other of said clutch members, whereby the tension of said clutch members can be determined.

8. An elastic shaft coupling as claimed in claim 1, wherein said resilient connectors each have a bore therethrough, measuring pins each connected to one of said clutch members slidably extend through the bore of one of said resilient connectors and each pin has measuring indicia thereon indicating the tension of said connectors.

9. An elastic shaft coupling as claimed in claim 1, wherein the one of said shafts includes a socket, a ball is connected to the other of said shafts, and said ball being rotatably mounted in said socket permitting angular deviations between said two shafts.

10. An elastic shaft coupling as claimed in claim 1, wherein one of said shafts includes a ball, a socket is connected to the housing mounted on the other of said shafts, and said ball is rotatably mounted in said socket permitting angular deviations between said shafts.

11. In an elastic shaft coupling having a drive member resiliently connected to a driven member for limited rotation relative to one another, a slip clutch comprising a pair of clutch plates having slanting peripheral faces, resilient means positioned between said clutch plates tending to move said plates apart, a housing being carried by said driven member, surrounding the periphery of said clutch plates and having conical slanting faces in frictional engagement with the periphery of said clutch plates.

12. An elastic shaft coupling as claimed in claim 1, wherein the one of said shafts includes a socket, a ball is connected to the other of said shafts, said ball being rotatably mounted in said socket permitting angular deviations between said two shafts, and a hydrodynamic pressure lubrication system is connected to said socket.

References Cited in the file of this patent

UNITED STATES PATENTS 2,002,115     Kjaer _____ May 21, 1935

FOREIGN PATENTS 972,298     France _____ Aug. 30, 1950